United States Patent
Demiany et al.

(10) Patent No.: US 7,992,732 B2
(45) Date of Patent: Aug. 9, 2011

(54) TRUCK RACK AND LOADING/UNLOADING SYSTEM

(75) Inventors: Erwin Cornel Demiany, Joshua Tree, CA (US); Robert Dale Beggs, Hancock, WI (US)

(73) Assignee: Demiany & Beggs Enterprises, LLC, Joshua Tree, CA (US)

( * ) Notice: Subject to any disclaimer, the term of this patent is extended or adjusted under 35 U.S.C. 154(b) by 96 days.

(21) Appl. No.: 12/252,644

(22) Filed: Oct. 16, 2008

(65) Prior Publication Data

US 2009/0173708 A1 Jul. 9, 2009

Related U.S. Application Data

(60) Provisional application No. 60/980,899, filed on Oct. 18, 2007, provisional application No. 61/024,035, filed on Jan. 28, 2008.

(51) Int. Cl.
*B66C 23/44* (2006.01)
(52) U.S. Cl. ......................... 212/180; 414/542
(58) Field of Classification Search .................. 212/180; 414/542
See application file for complete search history.

(56) References Cited

U.S. PATENT DOCUMENTS

| 1,464,131 | A | * | 8/1923 | Goodger | 414/542 |
|---|---|---|---|---|---|
| 2,506,930 | A | * | 5/1950 | Le Tourneau | 212/95 |
| 2,747,754 | A | * | 5/1956 | Maynard | 414/541 |
| 2,773,606 | A | * | 12/1956 | Shepherd | 414/23 |
| 3,276,610 | A | * | 10/1966 | Thatcher | 414/541 |
| 3,637,097 | A | | 1/1972 | Horowitz | |
| 3,700,123 | A | | 10/1972 | Corley, Jr. | |
| 3,863,782 | A | * | 2/1975 | Sandrock | 414/542 |
| 3,894,643 | A | * | 7/1975 | Wilson | 414/462 |
| 3,918,592 | A | * | 11/1975 | Paul | 254/390 |
| 4,265,585 | A | * | 5/1981 | Hawkins | 414/541 |
| 4,383,791 | A | | 5/1983 | King | |
| 4,613,274 | A | | 9/1986 | Stapleton | |
| 4,787,809 | A | | 11/1988 | Zrostlik | |
| 4,854,628 | A | * | 8/1989 | Halberg | 296/3 |
| 5,119,961 | A | | 6/1992 | Runn | |
| 5,641,262 | A | | 6/1997 | Dunlop et al. | |
| 6,019,567 | A | | 2/2000 | Lutkus et al. | |
| 6,234,741 | B1 | | 5/2001 | McDaniel | |
| 6,435,806 | B1 | | 8/2002 | Rinderknecht | |
| 6,622,455 | B2 | | 9/2003 | David et al. | |
| 6,688,837 | B2 | * | 2/2004 | Rinderknecht | 414/546 |
| 6,799,935 | B1 | | 10/2004 | Grollitsch | |
| 7,011,486 | B2 | * | 3/2006 | Dyer | 414/542 |
| 7,293,951 | B2 | * | 11/2007 | Meeks | 414/462 |

* cited by examiner

*Primary Examiner* — Thomas J. Brahan
(74) *Attorney, Agent, or Firm* — Dorsey & Whitney LLP

(57) ABSTRACT

A multi-use truck bed apparatus, comprising a first rack assembly, a second rack assembly, a base assembly coupled to the truck, wherein the first rack assembly and second rack assembly are coupled to the base assembly, and a lifting mechanism, wherein the lifting mechanism comprises a winch coupled to the second rack assembly.

10 Claims, 12 Drawing Sheets

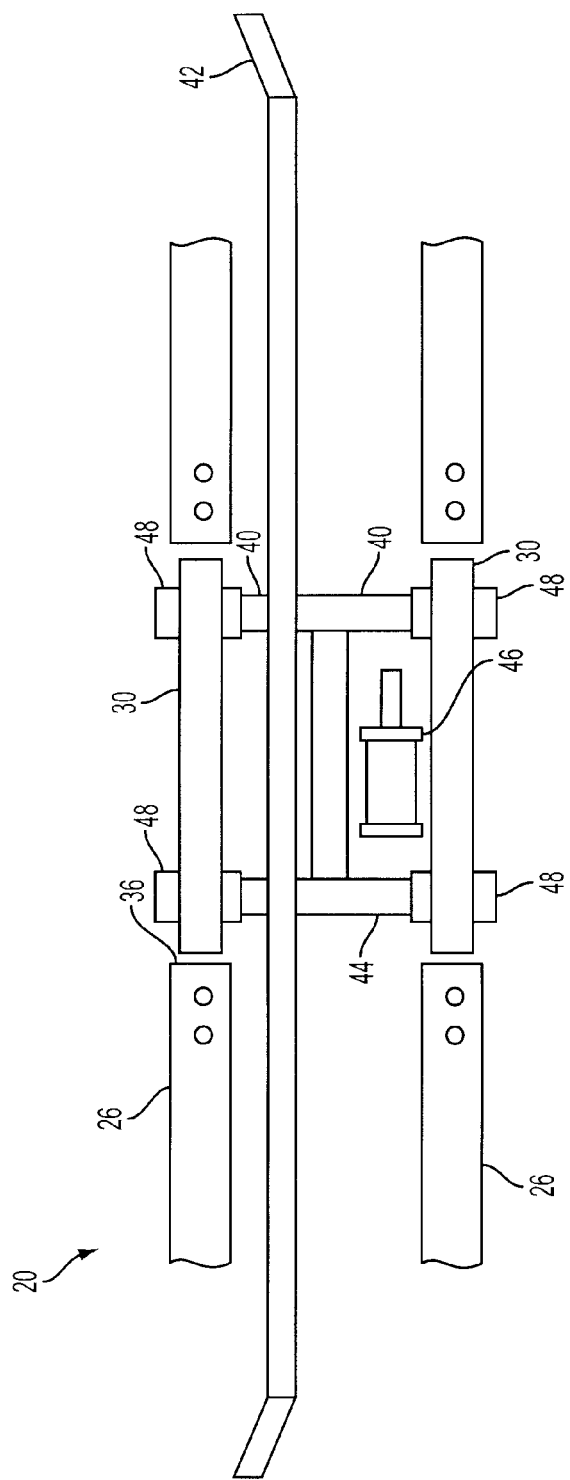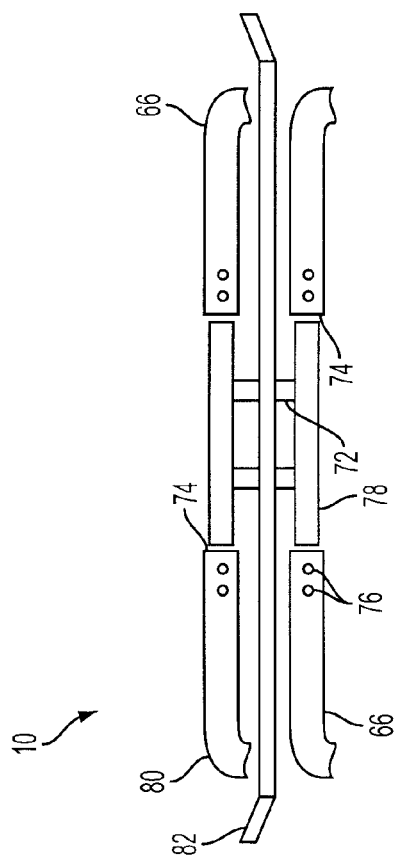

TRUCK RACK AND LOADING/UNLOADING SYSTEM

RELATED APPLICATIONS

This application claims the benefit of U.S. Provisional Applications Ser. No. 60/980,899, filed on Oct. 18, 2007, and Ser. No. 61/024,035, filed Jan. 28, 2008, the entire disclosure of both of which is incorporated herein by reference.

BACKGROUND

The present disclosure relates to apparatus and methods for transporting, manipulating and loading/unloading materials and equipment.

Currently, there are numerous truck rack, loading and/or unloading devices, methods and technologies in the market. Many of these, while effective, have limited utility in that they may not optimize ease of loading and/or loading, and they may be used to transport only materials of substantial length. Additionally, such technologies may be cumbersome to use, unsightly, and inhibit access to the truck bed.

There are also numerous truck bed ramp technologies available for loading and unloading wheeled equipment, such as for example, vehicles, tools, machinery, equipment, and the like. Loading such heavy items in this manner, however, is strenuous and involves a substantial likelihood of serious injury to an operator. Furthermore, such ramps require storage which may be impractical if a truck bed is near its storage capacity.

Lastly, there are available lift arm technologies which may be mounted in a truck bed, for example, in a corner thereof, to load and unload heavy items. Such technologies suffer from several drawbacks including their unsightly appearance and difficulty of installation. Additionally, such technologies are limited to the function of lifting and placing loads in a limited range of positions in a truck bed.

Thus, there is a need in the art for a multi-use apparatus which may facilitate the loading/unloading of materials and equipment as well as function as a rack for transporting materials of varied length and which overcomes the deficiencies of the existing technologies.

SUMMARY

In one embodiment, the present invention provides a multi-use truck bed apparatus, comprising a first rack assembly, a second rack assembly, a base assembly coupled to the truck, wherein the first rack assembly and second rack assembly are coupled to the base assembly, and a lifting mechanism, wherein the lifting mechanism comprises a winch coupled to the second rack assembly.

In one embodiment, the present invention further provides a multi-use truck bed apparatus, comprising one or more hydraulic cylinders coupled to the second rack assembly.

In one embodiment, the present invention further provides a multi-use truck bed apparatus, comprising a second rack assembly capable of rotation about an arc from a full forward position to a full rearward position.

In one embodiment, the present invention further provides a multi-use truck bed apparatus, wherein the second rack assembly, in the full forward position and in the full rearward position, is at a substantially similar height to that of the first rack assembly.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 2 is a bottom plan view of a portion of an embodiment of the present invention.

FIG. 3 is top plan view of a portion of an embodiment of the present invention.

DETAILED DESCRIPTION

Figure 1:
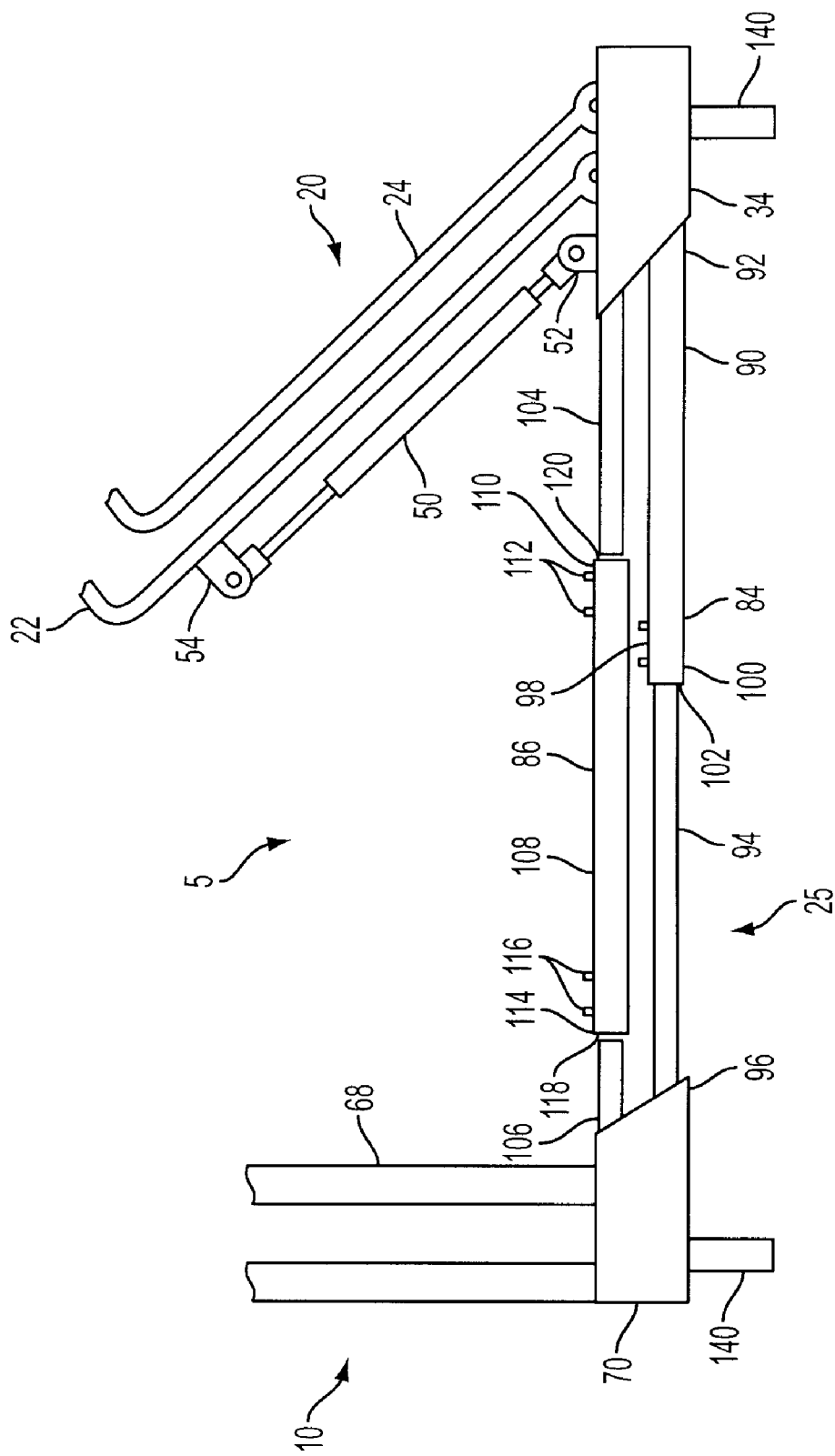
FIG. 1 is an elevational schematic showing one embodiment of the present invention.
Figure 4:
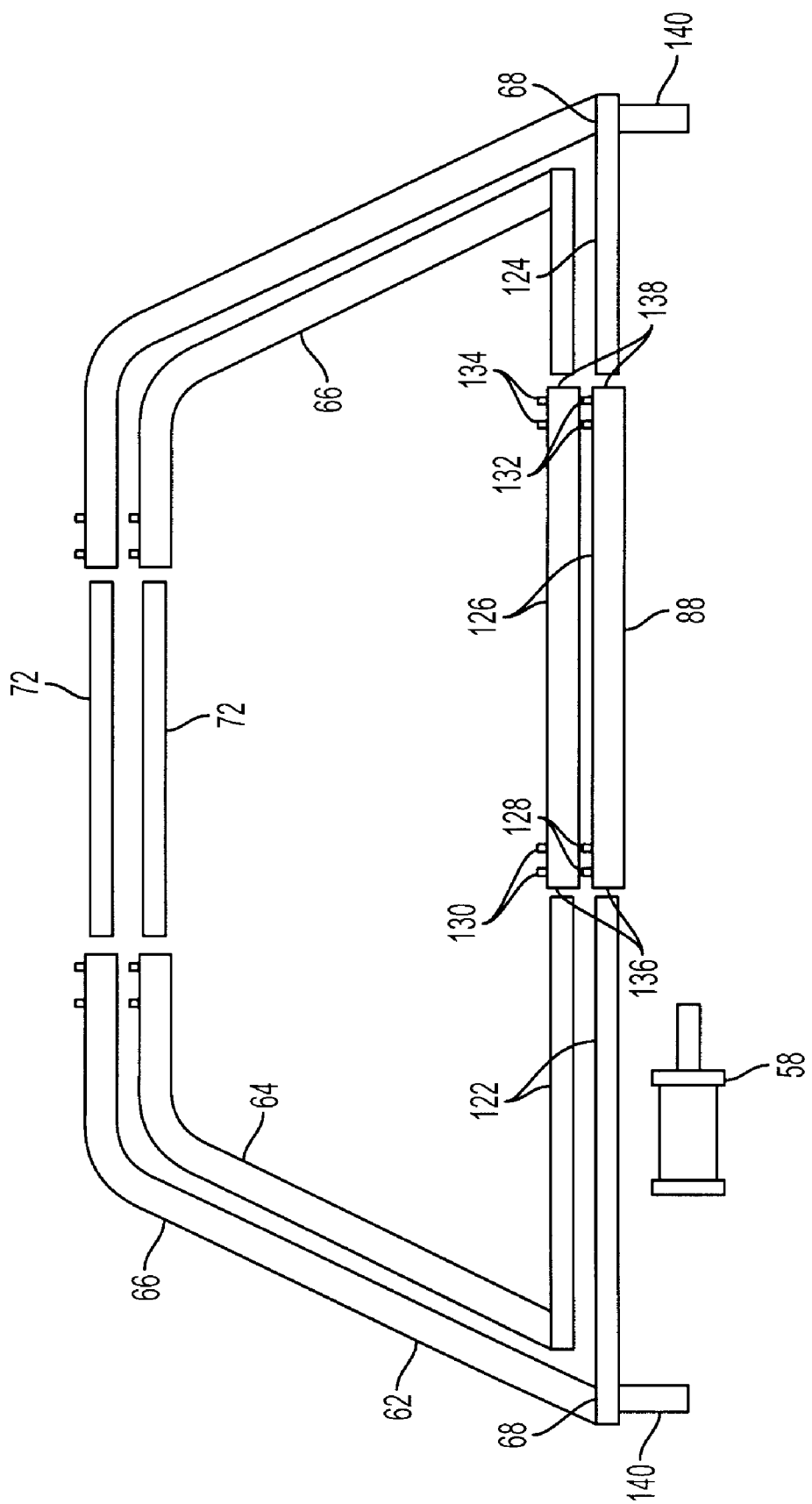
FIG. 4 is a rear elevational view of a portion of an embodiment of the present invention.

The present invention is a novel and advantageous multi-use apparatus and method for loading/unloading vehicles, machinery, materials, equipment, and the like as well as a rack for transporting materials and equipment.

As illustrated in FIGS. 1-13, in some embodiments, an adjustable multi-use truck bed apparatus 5 in accordance with the present invention comprises a front rack assembly 10, rear rack assembly 20, and base assembly 25. In certain embodiments, the front rack assembly 10 and rear rack assembly 20 may be mounted and/or adjustably or removeably mounted on the base assembly 25. In some embodiments, the base assembly 25 may be mounted, adjustably, removeably or permanently, on a truck 15. See, e.g., FIGS. 5-9, which also depict various operational positions and configurations of embodiments of the present invention.

Referring to FIGS. 1-4, in some embodiments, rear rack assembly 20 facilitates the loading/unloading process. In one embodiment, the rear rack assembly 20 may comprise a first rear hoop 22 and second rear hoop 24. In one embodiment, each of the rear hoops 22 and 24 may comprise tubular base portions 26 and a connecting portion 30 for selectively connecting the respective tubular base portions 26 to form the first rear hoop 22 and second rear hoop 24, respectively. In one embodiment, base portions 26 may comprise generally L-shaped hollow tubes having ends 32 which are pivotably coupled to rear corner base plates 34 of the base assembly 25.

In one embodiment, connecting member 30 may comprise a tubular rod having an outer diameter which is sized such that it may be slidingly received in the openings 36 of the tubular base portions 26. In one embodiment, tubular base portions 26 further comprise set screws 38, such that upon insertion of the connecting member 30 into openings 36, the position of the connecting member 30 may be fixed by adjustment of the set screws 38.

In some embodiments, support members 40 for supporting a rear rack member 42 may be coupled to connecting members 30. In one embodiment, ends of the support members 40 are received in bushings 48 which are disposed in apertures of the connecting member 30. In one embodiment, rear rack member 42 comprises end portions 43 extending radially outward therefrom substantially perpendicular to a longitudinal axis of the rear rack member 42. In one embodiment, a transverse support member 44 for supporting a winch 46 may be coupled to the support members 40. In one embodiment, winch 46 comprises a 2000 lb. electric winch.

In some embodiments, the rear rack assembly may further comprise one or more hydraulic cylinders 50. In one embodiment, hydraulic cylinders 50 may be pivotably coupled on a proximal end 52 to rear corner base plates 34 of the base assembly 25, and fixedly coupled on a distal end 54 to the first rear hoop 22. In some embodiments, as will be discussed further below, by extending and shortening the length of the cylinders 50, an operator can rotatably adjust the position of the rear rack assembly 20. In one embodiment, hydraulic connectors 56 may attach cylinders 50 to a hydraulic fluid power unit 58 to provide hydraulic fluid to effectuate the movement of cylinders 50.

In certain embodiments, either or both of the winch 46 and hydraulic cylinders 50 may be in electronic communication with a remote 60. In some embodiments, remote 60 may be mounted on one of the rear corner base plates 34 of the base assembly 25. In one embodiment, operation of either or both of the winch 46 and hydraulic cylinders 50 may be controlled with the remote 60.

In some embodiments, the front rack assembly 10 may comprise a first front hoop 62 and second rear hoop 64. In one embodiment, each of the rear hoops 62 and 64 may comprise tubular base portions 66 and connecting portions 72 for selectively connecting the respective tubular base portions 66 to form the first front hoop 62 and second front hoop 64, respectively. In one embodiment, base portions 66 may comprise generally L-shaped hollow tubes having ends 68 which are fixedly coupled to front corner base plates 70 of the base assembly 25.

In one embodiment, connecting portions 72 may comprise tubular rods having an outer diameter which is sized such that they may be slidingly received in openings 74 of the tubular base portions 66. In one embodiment, tubular base portions 66 further comprise set screws 76, such that upon insertion of the connecting portions 72 into openings 74, the position of the connecting portions 72 may be fixed by adjustment of the set screws 76.

In some embodiments, support members 78 for supporting a front rack member 80 may be coupled to connecting portions 72. In one embodiment, front rack member 80 comprises end portions 82 extending radially outward therefrom substantially perpendicular to a longitudinal axis of the front rack member 80.

In some embodiments, base assembly 25 may comprise a first side portion 84, a second side portion 86, and a front connecting portion 88. In certain embodiments, first side portion may comprise a first tubular portion 90 coupled on a first end 92 to one of the rear corner base plates 34 and a second tubular portion 94 coupled on a first end 96 to one of the front corner base plates 70. In one embodiment, the first tubular portion 90 may comprise a hollow tubular rod having one or more set screws 98 disposed on a second end 100. In one embodiment, the second tubular portion 94 may comprise a tubular rod having an outer diameter which is sized such that it may be slidingly received in an opening 102 of the first tubular portion 90. In one embodiment, upon insertion of the second tubular portion 94 into the opening 102, the total length of the first side portion may be fixed by adjustment of the set screws 98.

In some embodiments, the second side portion 86 of the base assembly 25 may comprise a first tubular portion 104 coupled on a first end to one of the rear corner base plates 34, a second tubular portion 106 coupled on a first end to one of the front corner base plates 70, and a hollow tubular portion 108. In one embodiment, the hollow tubular portion 108 may comprise a hollow tubular rod having a first end 110 with one or more set screws 112 disposed thereon and a second end 114 with one or more set screw 116 disposed thereon. In one embodiment, the first and second tubular portions may comprise tubular rods having an outer diameter which is sized such that they may be slidingly received in openings 118 and 120 of the hollow tubular portion 108. In one embodiment, upon insertion of the first and second tubular portions 104 and 106 into the openings 118 and 120 of the hollow tubular portion 108, the total length of the second side portion 86 of the base assembly 25 may be fixed by adjustment of the set screws 112 and 116.

In some embodiments, the front side portion 88 of the base assembly 25 may comprise a pair of first tubular portions 122 coupled on a first end to one of the front corner base plates 34, a pair of second tubular portions 124 coupled on a first end to another of the front corner base plates 70, and a pair of hollow tubular portions 126. In one embodiment, the hollow tubular portions 126 may comprise hollow rods having first ends 128 with one or more set screws 130 disposed thereon and second ends 132 with one or more set screws 134 disposed thereon. In one embodiment, the first and second tubular portions 122 and 124 may comprise tubular rods having outer diameters sized such that they may be slidingly received in openings 136 and 138 of the hollow tubular portions 126. In one embodiment, upon insertion of the first and second tubular portions 122 and 124 into the openings 136 and 138 of the hollow tubular portions 126, the total length of the front side portion 88 of the base assembly 25 may be fixed by adjustment of the set screws 130 and 134.

It should be appreciated that using telescoping members in the base assembly provide for adjusting the length of the apparatus 5 to fit various sizes of trucks, particularly various bed lengths. Similarly, in some embodiments, the width of the base assembly and the rack assemblies may be adjustable as well, see, e.g. FIG. 4.

In one embodiment, the apparatus 5 may be coupled or mounted to the truck 15 by stake members 140. In one embodiment, stake members 140 may extend radially downward from either or both of the front corner base plates 70 and either or both of the rear corner base plates 34, and may be positioned in the stake pockets 142 of the truck bed sidewalls to mount or secure the apparatus 5 to the truck.

Figure 5:
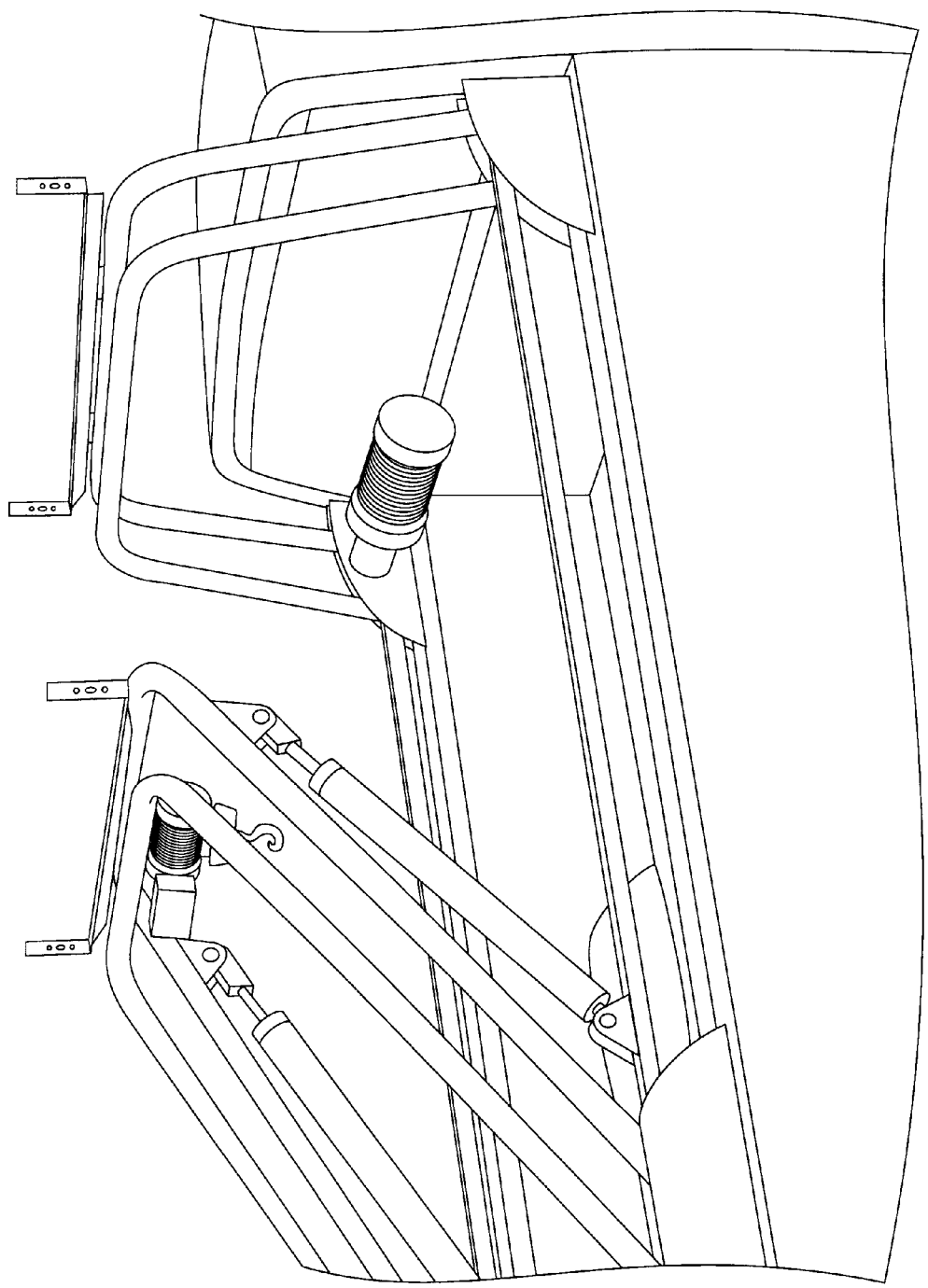
FIGS. 5-9 depict an embodiment of the present invention in various operational positions.
Figure 6:
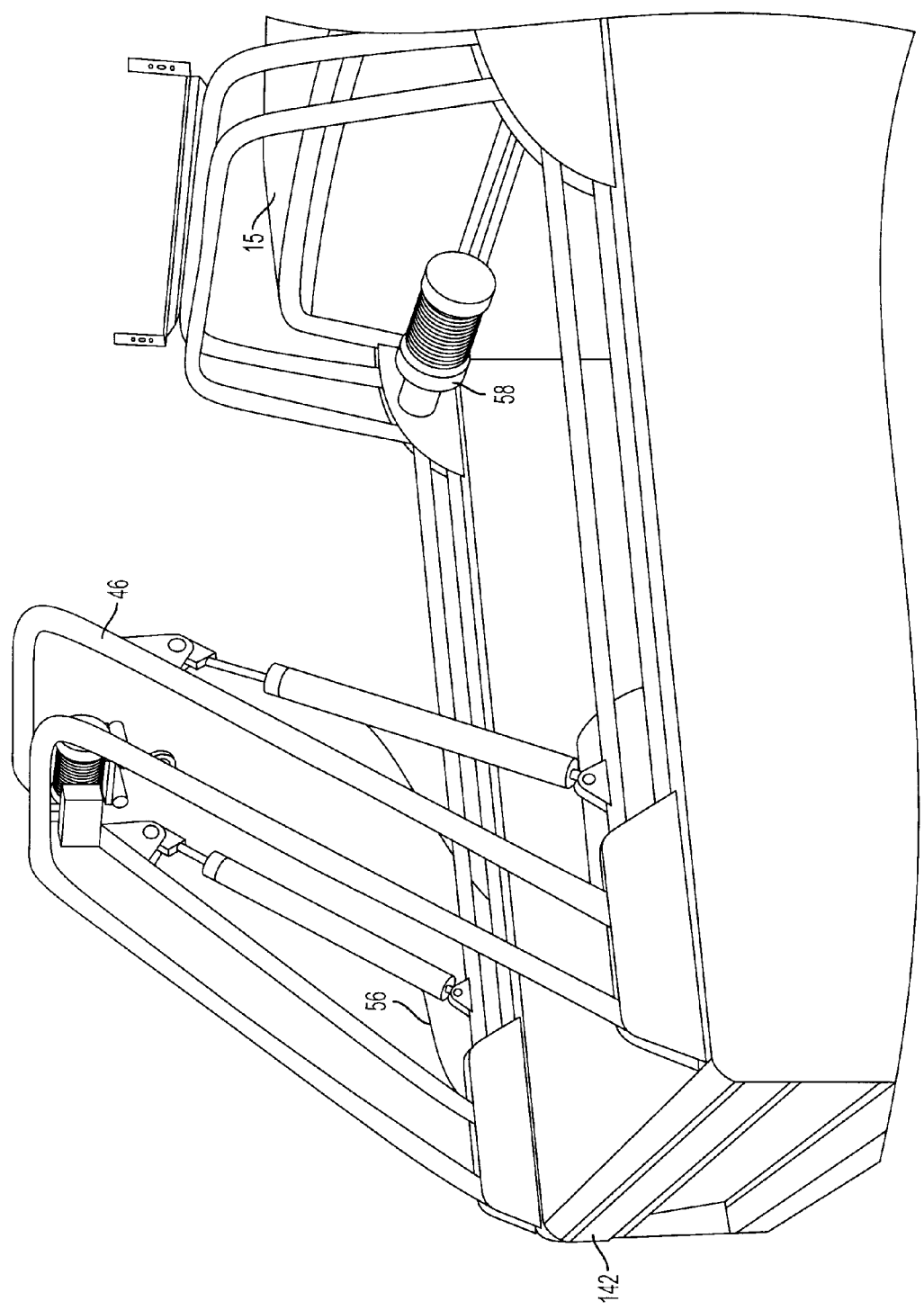
Figure 7:
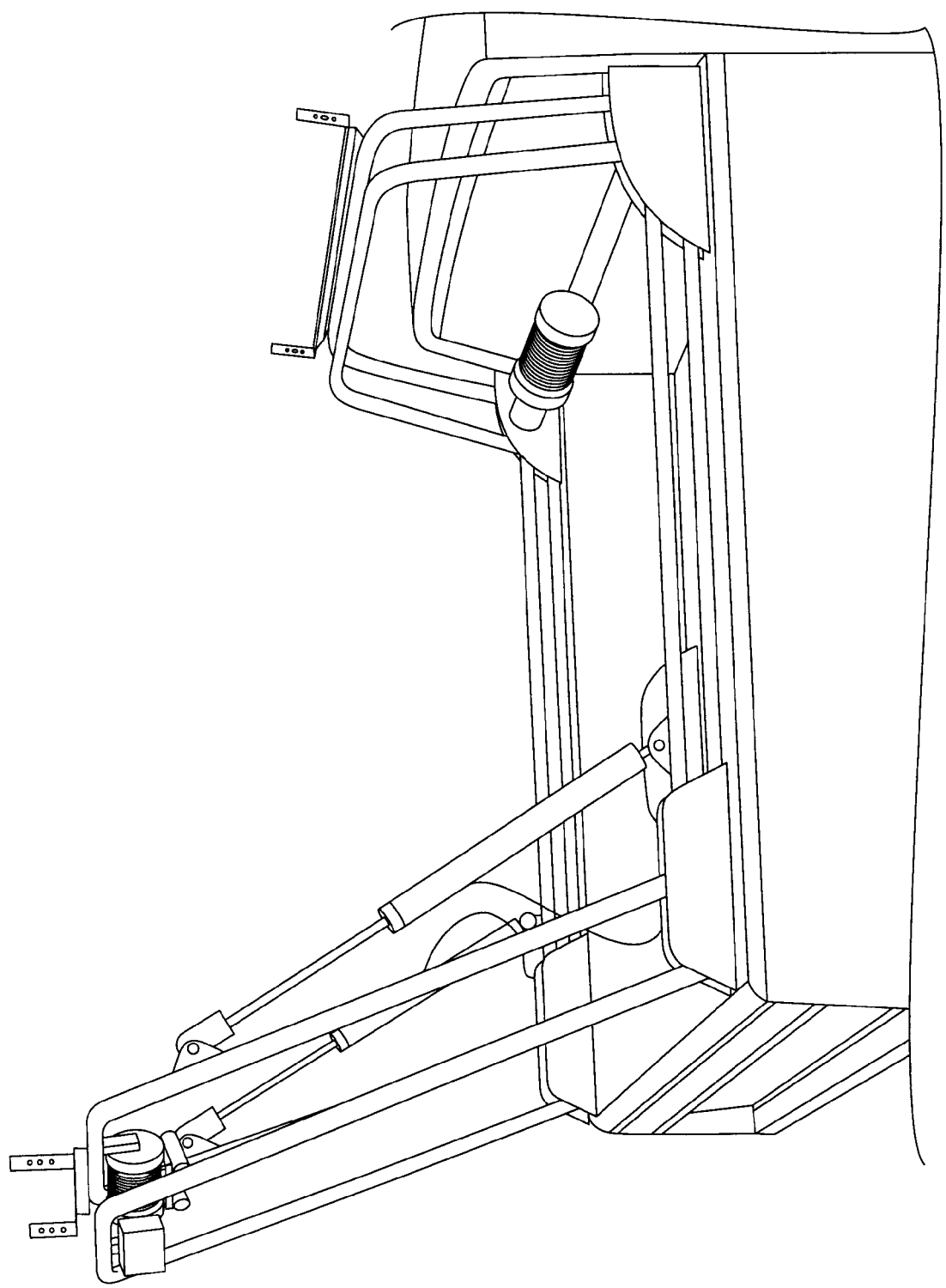
Figure 8:
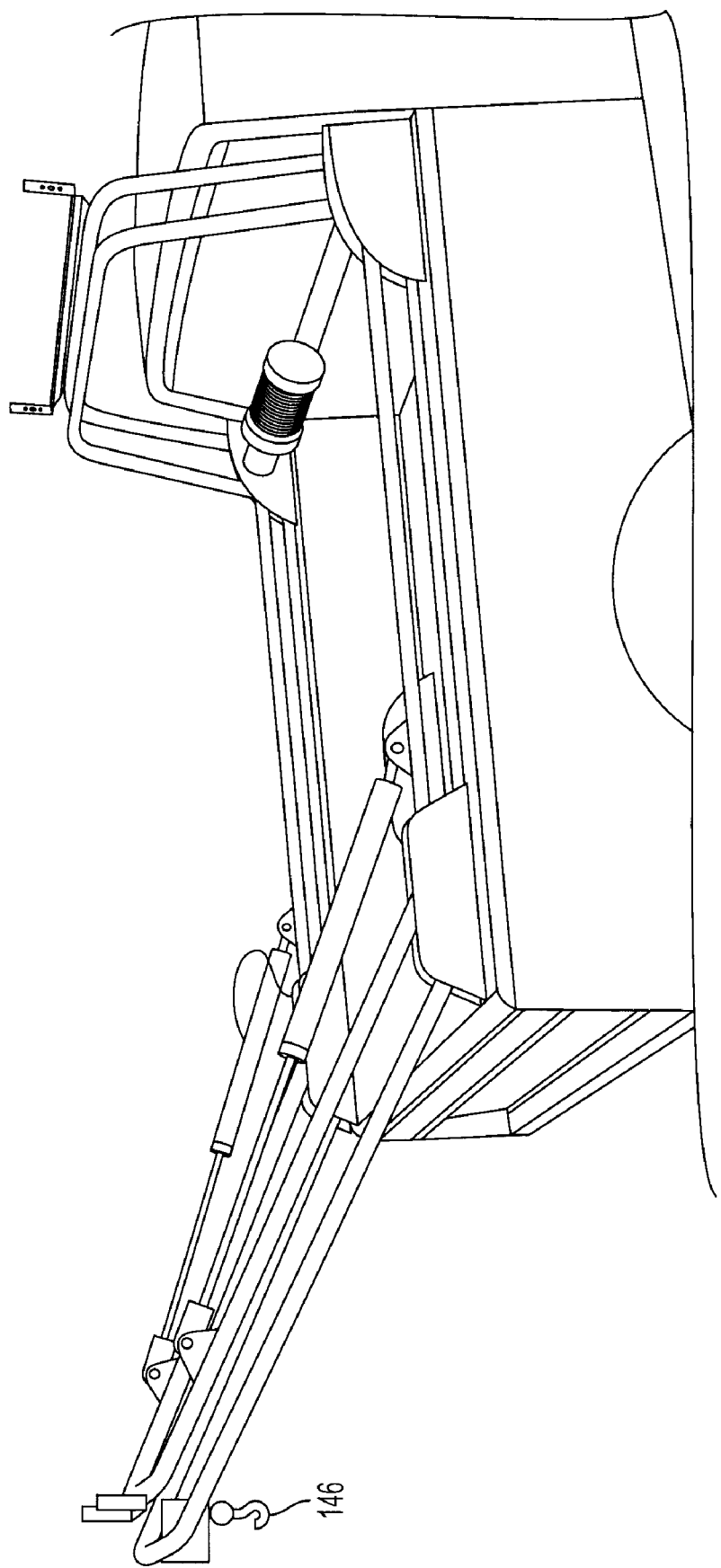
Figure 9:
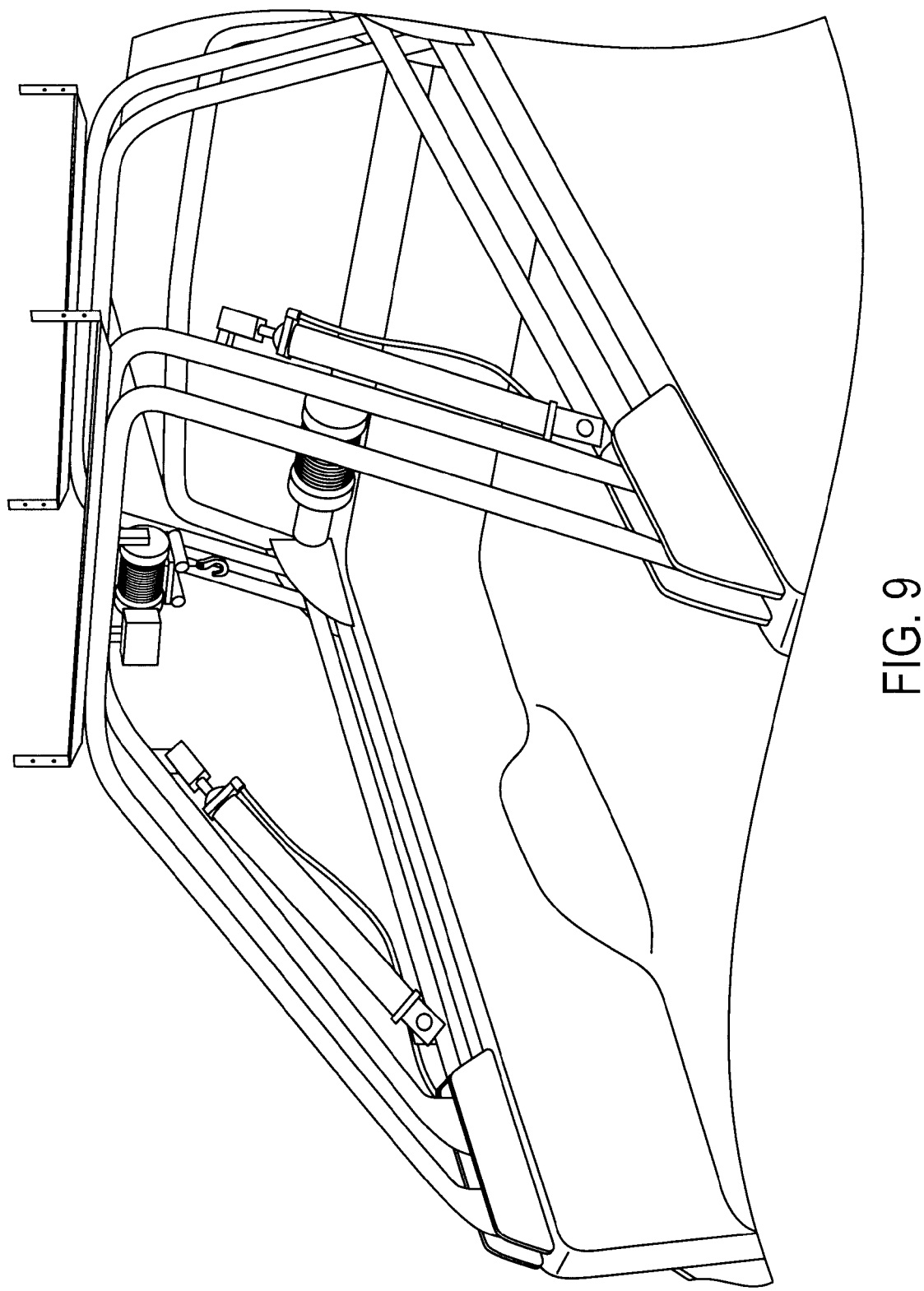
Figure 10:
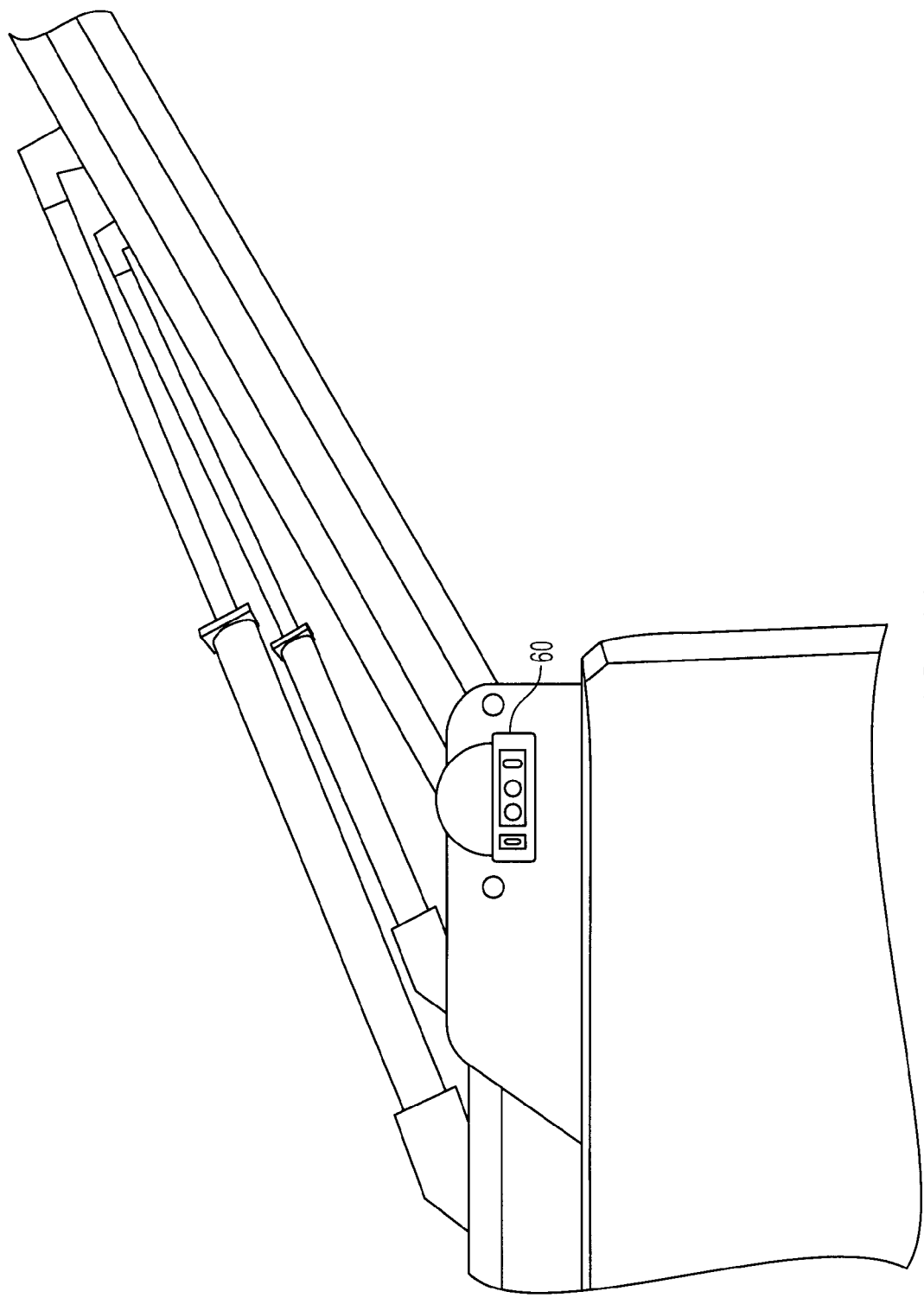
FIG. 10 depicts an embodiment of the present invention, including an embodiment of a control mechanism.
Figure 11:
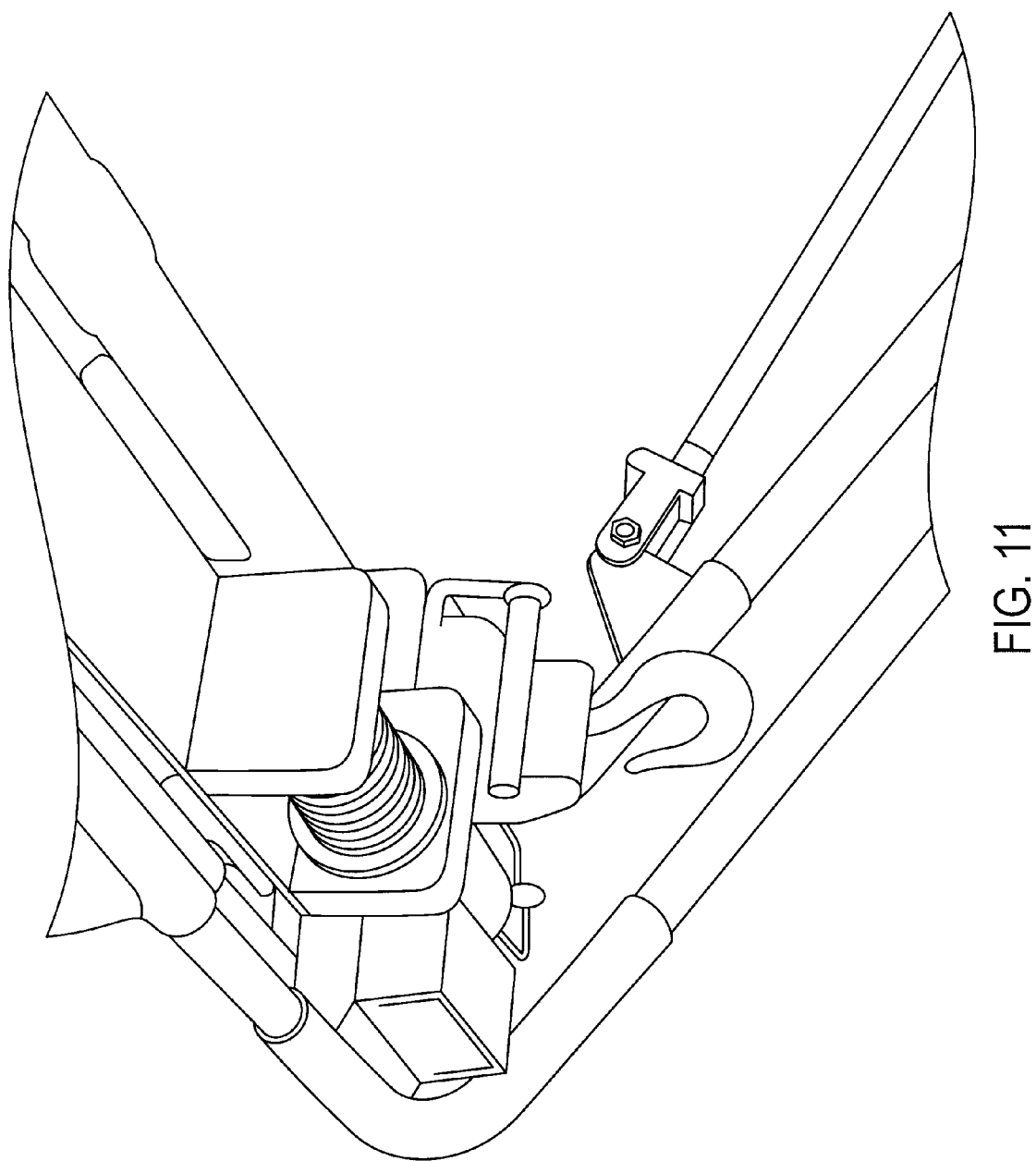
FIG. 11 depicts an embodiment of the present invention, including one embodiment of the coupling between the hydraulic cylinders are the rear rack assembly and how the winch may be carried by the rear rack assembly.

In some embodiments, the rear rack assembly 20 may be rotated about an arc from a full forward position, illustrated in FIG. 5, to a full rearward position, illustrated in FIG. 8. In one embodiment, movement of the rear rack assembly 20 is accomplished by means of the hydraulic cylinders 50. In a particular embodiment, lengthening of the hydraulic cylinders 50 causes the rear rack assembly 20 to rotate in a direction toward the full rearward position, and a shortening of the hydraulic cylinders 50 causes the rear rack assembly 20 to rotate in a direction toward the full forward position.

In some embodiments, if the rear rack assembly 20 is in the full forward position or the full rearward position, the rear rack assembly 20 may be at a height relative to the ground or the truck which is substantially similar to that of the front rack assembly 10, i.e., the rear rack assembly 20 may be moved into and fixed in a position wherein the portions of the front rack assembly 10 and rear rack assembly 20 which are generally transverse to the longitudinal length of the truck on which the rack assemblies are mounted are generally coplanar. Such positioning of the rear rack assembly 20 relative to the front rack assembly 10 may allow the apparatus 5 to function as an overhead rack. For example, in one embodiment, if the rear rack assembly 20 is in the full rearward position, an overhead rack of about 12 feet long may be created. An overhead rack of such length may be ideal for transporting pipe, long lengths of lumber, and the like, for example.

In some embodiments, the truck-bed apparatus 5 may be used to load or lift materials, equipment, vehicles, and the like into the bed of the truck. In one embodiment, the rear rack assembly 20 may be rotated to a selected loading position wherein the winch 46 is positioned beyond the rear end of the truck. In one embodiment, the selected loading position may comprise the fill rearward position. In the selected loading position, in some embodiments, a winch cable 144 may be lowered and coupled to a load by connecting means 146. The load may then, in some embodiments, be lifted a desired distance off the ground by actuation of winch 146.

In some embodiments, the rear rack assembly may then be rotated to a selected loading position wherein the winch 46, and thus the load, are positioned over and/or in the bed of the truck. The load may then, in some embodiments, be lowered onto the bed of the truck by actuation of winch 46. It will be appreciated by those skilled in the art that unloading may be achieved in a substantially similar, but reverse manner.

Figure 12:
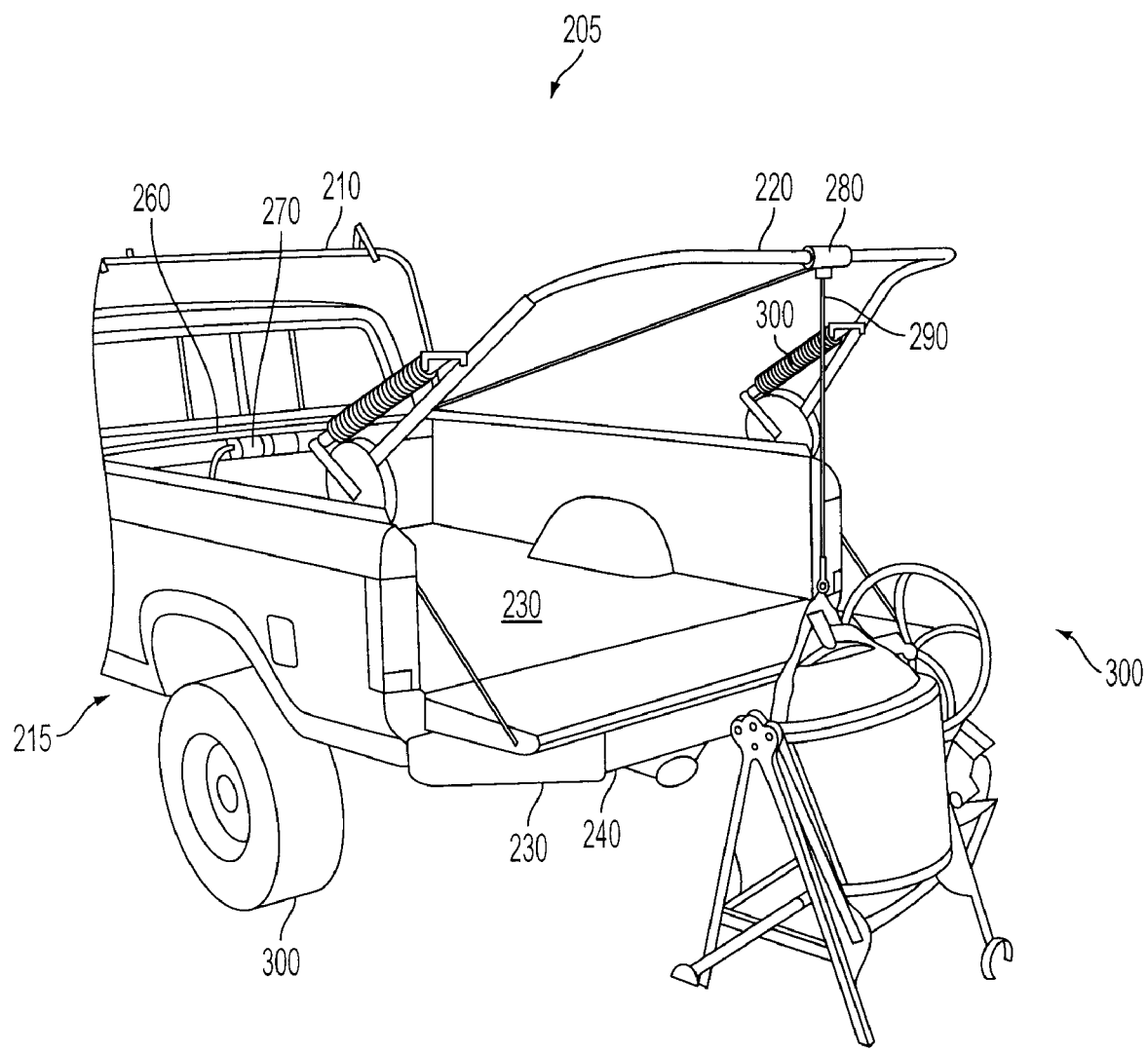
FIG. 12 depicts another embodiment of the present invention.
Figure 13:
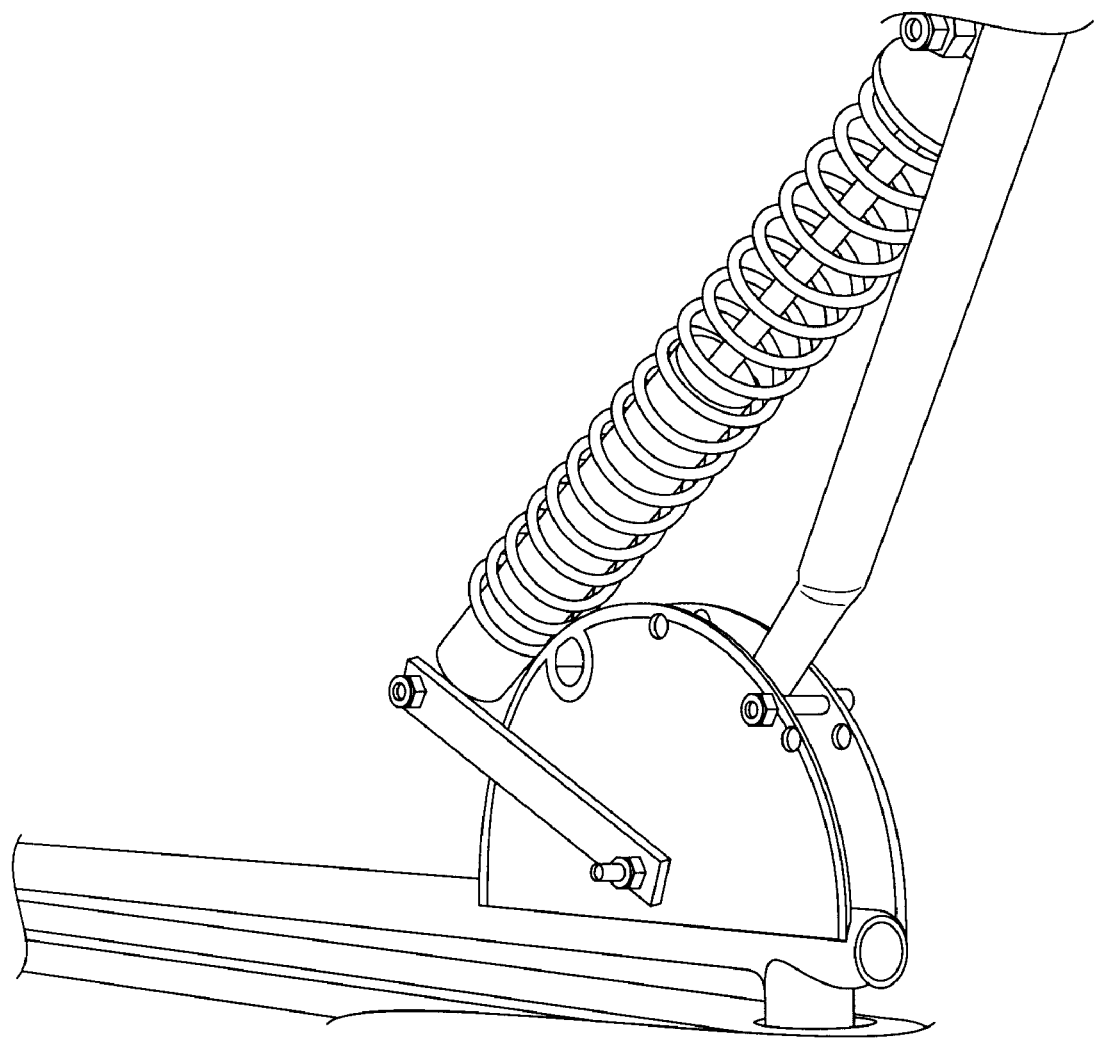
FIG. 13 depicts another embodiment of the present invention, including an embodiment of the coupling of the rear rack assembly and the base assembly.

FIG. 12 is an elevational schematic showing of a multi-use truck bed apparatus 205 in accordance with one embodiment of the present invention. In some embodiments, a multi-use truck bed apparatus 205 comprises a first rack hoop 210 and a second rack hoop 220. In certain embodiments, the first rack hoop 210 and second rack hoop 220 are mounted on a truck 215. In one embodiment, the first rack hoop 210 is stationary. In another embodiment, the second rack hoop 220 is rotatably mounted to a truck bed 230. For example, in one embodiment, the second rack hoop 220 may rotated in an arc between a fill forward position and a full rearward position. The second rack hoop 220 may be maintained in the full forward position or the full rearward position by one or more locking pins. It should be appreciated that, in use, the multi-use truck bed apparatus 205 moves the load from a lift position beyond the rear end of the truck to a loaded position wherein the load has been moved forwardly into a selected position over and/or in the bed of the truck In some embodiments, the multi-use truck bed apparatus 205 also includes a lifting mechanism which comprises a winch 270, pulley 280, and cable 290. In some embodiments, the winch 270 is a 2000-pound electric winch, but winches of other capacity may be suitable, too. In one embodiment, the winch 270 is slidably attached to a truck cab wall 260 such that it may be moved laterally between the sidewalls of the truck bed. In one embodiment, the pulley 280 is slidably attached the second rack hoop 220 such that it may be moved laterally a distance which is substantially similar to that distance which the winch 270 may be moved. Such lateral movement accommodates placement of items in the truck bed in various configurations, such as for example, a side-by-side configuration.

In certain embodiments, the winch 270 is actuated with a cordless remote. In some embodiments, materials, equipment, vehicles, and the like may be lifted via the cable 290 which travels from the winch 270 and is fed or retracted by means of the winch 270 through the pulley 280.

In another embodiment, the lifting mechanism further comprises one or more coil shock absorbers 300. Generally, shock absorbers 300 may facilitate the loading/unloading process and also increase the safety of the apparatus 205 in the event of a cable break or other apparatus failure. In one embodiment, the coil shock absorbers are operatively connected to the second rack hoop 220. The coil shock absorbers 300 provide lift to the second rack hoop 220 when initiating an unload sequence. In an unload sequence, a load is lifted by means of the winch 270 and pressure resulting from compressed coils is relieved from the locking pins that are maintaining the second rack hoop in the full forward position. Once the locking pins are removed, and as the winch is let out, the second rack hoop 220 is controllably rotated in an arc to the full rearward position before the load begins to drop through the pulley 280. Additionally, although there may be substantial energy stored in the coil shock absorbers 300, in a compressed state, a valving component in the shocks 300 may prevent any rapid movement in the event of failure, such as for example, a severed cable. An additional utility of the coil shock absorbers 300 is the prevention of excessive rattling and clanging common to conventional rack systems.

In some embodiments, the second rack hoop 220 may be maintained in the full forward position, creating a short overhead rack, ideal for transporting sheets of sheetrock, plywood, and the like while keeping the truck bed 230 free for loads and allowing standing access to the whole rear half of the bed. In other embodiments, the second rack hoop 220 may be maintained in the full rearward position, creating a longer overhead rack, ideal for transporting pipe, long lengths of lumber, and the like. For example, in one embodiment, when the second rack hoop 220 is in the full rearward position, an overhead rack of about 12-feet long is created. (Other embodiments, including the other embodiment discussed above, may be used and function similarly.)

In some embodiments, if the second rack hoop 220 is in the full forward position or full rearward position, the second rack hoop 220 is at a height relative to the ground which is substantially similar to that of the first rack hoop 210, i.e., the rack hoops are able to be moved into and fixed in a position wherein the portions of the hoops which are generally transverse to the longitudinal length of the truck on which the hoops are mounted are generally coplanar. (Again, other embodiments, including the other embodiment discussed above, may be used and function similarly.)

The foregoing description refers to various tubular members and tubular portions. It should be appreciated that the present disclosure anticipates such structures being formed by a single elongated piece of material, or by a number of suitable joined pieces. It should be further appreciated that the present disclosure does not limit such structures to those having annular cross sections, but may comprise structures have cross sections of any shape, such as for example, square or rectangular.

With regard to fastening, mounting, attaching or connecting components of the present invention to form the multi-use truck bed apparatus or components thereof, in accordance with the present invention, unless specifically described otherwise, such are intended to encompass conventional fasteners such as screw threads, threaded connectors, snap rings, detent arrangements, clamps, pins and the like. Components may also be connected by adhesives, glues, welding, ultrasonic welding, and friction fitting or deformation, if appropriate, and appropriate liquid and/or airtight seals or sealing devices may be used. Any electronic portions in accordance with the present invention may use conventional, commercially available electronic components, connectors and devices such as suitable wiring, connectors, printed circuit boards, microchips, sensors, inputs, outputs and the like. Unless specifically otherwise disclosed or taught, materials for making the present invention and/or components thereof may be selected from appropriate materials such as metal, metallic alloys, ceramics, plastics and the like, and appropriate manufacturing or production methods including casting, pressing, extruding, molding and machining may be used.

In the foregoing description, embodiments of the present invention, including preferred embodiments, have been presented for the purpose of illustration and description. They are not intended to be exhaustive or to limit the invention to the precise forms disclosed. Obvious modifications or variations are possible in light of the above teachings. The embodiments were chosen and described to provide the best illustrations of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. A multi-use loading and unloading apparatus for use with a truck comprising a truck bed, the apparatus comprising:
   a first rack assembly fixedly mounted proximate a front end of the truck bed, the first rack assembly comprising a first hoop, the first hoop comprising a pair of first upright members and a first cross member extending therebetween;
   a second rack assembly rotatably mounted proximate a rear end of the truck bed, the second rack assembly comprising a second hoop, the second hoop comprising a pair of second upright members and a second cross member extending therebetween, wherein each of the second upright members has a fixed length;
   a drive mechanism operatively coupled to the second hoop to effect a rotational movement of the second hoop; and
   a lifting mechanism comprising a winch and a cable coupled to said second rack assembly;
   wherein the second hoop is rotatable between a full-forward and a full-rearward position;
   wherein in each of the full-forward and full-rearward positions a height of the first cross member relative to the truck bed is substantially the same as a height of the second cross member relative to the truck bed; and
   wherein in the full-forward position the second cross member is positioned above the truck bed and in the full-rearward position the second cross member is positioned beyond a rear end of the truck bed.

2. The apparatus of claim 1, wherein the drive mechanism comprises one or more hydraulic cylinders.

3. The apparatus of claim 1, further comprising one or more coil shock absorbers coupled to said second hoop.

4. The apparatus according to claim 1, further comprising a base assembly coupled to the truck, wherein the first rack assembly and second rack assembly are carried by the base assembly, and wherein the base assembly comprises a pair of lateral side portions each comprising a pair of telescoping members, the base portions extending between the front and rear rack assemblies.

5. The apparatus of claim 1, wherein in the full-rearward position the second hoop is not further rotatable in the rearward direction.

6. The apparatus of claim 5, wherein in the full-forward position the second hoop is not further rotatable in the forward direction.

7. The apparatus of claim 6, wherein in the full-rearward position a distance between the first and second cross members in a direction substantially parallel to the longitudinal dimension of the truck bed is about 12 feet or more.

8. The apparatus of claim 7, wherein in the full-forward position a distance between the first and second cross members in a direction substantially parallel to the longitudinal dimension of the truck bed is about half the length of the truck bed or less.

9. The apparatus of claim 5, wherein in the full-forward position, a distance between the first and second cross members in a direction substantially parallel to the longitudinal dimension of the truck bed is about shorter than the distance between the first and second cross members in a direction substantially parallel to the longitudinal dimension of the truck bed in the full-rearward position.

10. The apparatus of claim 1, wherein each of the first and second rack assemblies comprises a support member positioned atop said first and second rack assemblies, and wherein the support members are configured to provide lateral support to a load being carried across the first and second rack assemblies.

* * * * *

UNITED STATES PATENT AND TRADEMARK OFFICE
CERTIFICATE OF CORRECTION

PATENT NO. : 7,992,732 B2  
APPLICATION NO. : 12/252644  
DATED : August 9, 2011  
INVENTOR(S) : Demiany et al.

It is certified that error appears in the above-identified patent and that said Letters Patent is hereby corrected as shown below:

SPECIFICATION

| Column | Line | PTO | Should Read |
|---|---|---|---|
| 5 | 19 | fill rearward position | full rearward position |
| 5 | 40 | between a fill | between a full |

Signed and Sealed this  
Twenty-seventh Day of September, 2011

David J. Kappos  
*Director of the United States Patent and Trademark Office*